UNITED STATES PATENT OFFICE.

WILLIAM A. FAIRBURN, OF SHORT HILLS, NEW JERSEY, ASSIGNOR TO THE DIAMOND MATCH COMPANY, OF CHICAGO, ILLINOIS, A CORPORATION OF ILLINOIS.

MATERIAL FOR MATCH-STRIKING SURFACES.

1,070,023.  Specification of Letters Patent.  Patented Aug. 12, 1913.

No Drawing.  Application filed October 16, 1912.  Serial No. 726,023.

*To all whom it may concern:*

Be it known that I, WILLIAM A. FAIRBURN, a citizen of the United States, and resident of Short Hills, in the county of Essex and State of New Jersey, have invented certain new and useful Improvements in Material for Match-Striking Surfaces, of which the following is a specification.

This invention relates to material for producing striking surfaces for matches of the safety strike-on-box variety. Heretofore the base of such material has been red amorphous phosphorus which, unless in a state of absolute purity—which is rare—contains poisonous white or yellow phosphorus. Moreover, it must be manipulated with great care as otherwise it may explode or ignite violently. Again, it is generally necessary that the amorphous phosphorus be associated with black antimony sulfid in order that the composition may best subserve its function, thereby precluding the coloring of the composition. For these reasons, among others, the use of red amorphous phosphorus (or any other allotropic form of phosphorus) in the manufacture of striking-surface compositions is objectionable.

The main object of my invention is to provide an efficient striking-surface material, which is free from amorphous phosphorus, and which may, if desired, be colored. To that end I employ, as the basic ingredient of the material, sesquisulfid of phosphorus ($P_4S_3$)—a definite stable compound which when properly prepared not only is free from white or yellow phosphorus and other poisonous impurities but is less liable than amorphous phosphorus to explode violently while being manipulated. This material produces a surface which effects a smooth ignition of the match head composition with slight rubbing friction, as thereby combustion is produced at a lower temperature than in the case of a striking surface containing amorphous phosphorus. The temperature of ignition of red amorphous phosphorus is about 500° F. and of sesquisulfid of phosphorus about 200° F. Incorporated with the sesquisulfid of phosphorus is a non-combustible substance which obviates any liability of accidental ignition of the sesquisulfid of phosphorus by the friction thereon of the elements constituting the head of the match, which substance is of such character as to permit the efficient use of coloring ingredients in the composition. This fire-proofing substance preferably comprises asbestos powder, which, together with the sesquisulfid of phosphorus, is mixed with suitable binding, abrasive and filling agents, and the whole worked into a paint of proper consistency for application to the side of a match box. For example, the following mixture may be used: Sesquisulfid of phosphorus, 6 parts, by weight; asbestos powder 13 parts, by weight; glass powder 17 parts, by weight; gum arabic, 7 parts, by weight; and water 26 parts, by weight. This mixture is white or pale yellow, and hence any suitable coloring matter may be added thereto as desired.

The proportion herein given is not of the essence of my invention as the same may be varied to meet particular requirements. Moreover other fire-proofing, binding, abrasive and filling substances may be used instead of those herein specified.

I claim as my invention—

1. The herein described material for striking surfaces for matches of the safety strike-on-box type, the said material containing, as essential ingredients, sesquisulfid of phosphorus and a non-combustible substance, the latter being of a character and the ingredients being in such proportions as to restrict the ignition to the match composition that is brought in contact with said material.

2. The herein described material for striking surfaces for matches of the safety strike-on-box type, the said material containing, as essential ingredients, sesquisulfid of phosphorus and asbestos powder.

3. The herein described material for striking surfaces for matches of the safety strike-on-box type, the said material being composed of sesquisulfid of phosphorus, asbestos powder, inert substance, and a binding agent.

4. The herein described material for striking surfaces for matches of the safety strike-on-box type, the said material being composed of sesquisulfid of phosphorus, asbestos powder, inert substance, a binding agent, and coloring matter.

Signed at New York in the county and State of New York this 15th day of October A. D. 1912.

WILLIAM A. FAIRBURN.

Witnesses:
 JOHN K. NOLAN,
 B. CHANDLER SNEAD.

Copies of this patent may be obtained for five cents each, by addressing the "Commissioner of Patents, Washington, D. C."